(12) United States Patent
Okada et al.

(10) Patent No.: US 10,998,758 B2
(45) Date of Patent: May 4, 2021

(54) POWER SUPPLY APPARATUS AND ELECTRICITY STORAGE DEVICE

(71) Applicant: MURATA MANUFACTURING CO., LTD., Kyoto (JP)

(72) Inventors: Masami Okada, Kyoto (JP); Atsuo Fujita, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 275 days.

(21) Appl. No.: 16/247,095

(22) Filed: Jan. 14, 2019

(65) Prior Publication Data

US 2019/0148976 A1 May 16, 2019

Related U.S. Application Data

(63) Continuation of application No. PCT/JP2017/026631, filed on Jul. 24, 2017.

(30) Foreign Application Priority Data

Oct. 27, 2016 (JP) .............................. JP2016-210204

(51) Int. Cl.
*H02J 9/06* (2006.01)
*H02J 7/00* (2006.01)
(Continued)

(52) U.S. Cl.
CPC ............ *H02J 9/061* (2013.01); *H01H 47/00* (2013.01); *H01H 47/002* (2013.01); *H02J 3/383* (2013.01);
(Continued)

(58) Field of Classification Search
CPC .. H02J 9/061; H02J 9/06; H02J 7/0068; H02J 7/35; H02J 3/383; H02J 9/068;
(Continued)

(56) References Cited

U.S. PATENT DOCUMENTS 6,104,583 A * 8/2000 Wynn ..................... H02H 9/026
361/106
7,916,438 B2 * 3/2011 Ward ....................... H02H 3/33
361/42
(Continued)

FOREIGN PATENT DOCUMENTS

JP H03205728 A 9/1991
JP 2003018765 A 1/2003
(Continued)

OTHER PUBLICATIONS

European Search Report dated Apr. 17, 2020 in corresponding European Application No. 17865066.9.
(Continued)

*Primary Examiner* — Jared Fureman
*Assistant Examiner* — Michael J Warmflash
(74) *Attorney, Agent, or Firm* — K&L Gates LLP

(57) ABSTRACT

A power supply apparatus includes a latch type first relay inserted between a system power supply and a load, where the latch type first relay includes a switch, a tripping coil configured to open the switch, and a closing coil configured to close the switch, an electricity storage system including a charging and discharging unit inserted between a secondary battery and the load, a non-latch type second relay including a contact and an operating coil configured to open and close the contact, where the operating coil is connected between the electricity storage system and the load, and a control circuit connected to the first relay via the contact of the second relay.

13 Claims, 5 Drawing Sheets

(51) Int. Cl.
*H01H 47/00* (2006.01)
*H02J 7/35* (2006.01)
*H02J 3/38* (2006.01)

(52) U.S. Cl.
CPC .............. *H02J 7/0068* (2013.01); *H02J 7/35* (2013.01); *H02J 9/06* (2013.01); *H02J 9/068* (2020.01)

(58) Field of Classification Search
CPC ...... H01H 47/00; H01H 47/002; H01H 47/02; H01H 47/32; Y02B 10/70; Y02E 10/56
See application file for complete search history.

(56) References Cited

U.S. PATENT DOCUMENTS

| | | | | |
|---|---|---|---|---|
| 8,810,066 | B2* | 8/2014 | Moon | H02J 3/32 |
| | | | | 307/65 |
| 10,418,820 | B2* | 9/2019 | Moriyama | H02J 3/381 |
| 2007/0114848 | A1* | 5/2007 | Mulhouse | H02J 7/34 |
| | | | | 307/43 |
| 2008/0094038 | A1* | 4/2008 | Okada | H02J 7/045 |
| | | | | 320/163 |
| 2009/0195075 | A1* | 8/2009 | Ziegler | H02J 9/061 |
| | | | | 307/66 |
| 2009/0305126 | A1* | 12/2009 | Choi | H01M 2/34 |
| | | | | 429/159 |
| 2010/0084918 | A1* | 4/2010 | Fells | H02J 50/60 |
| | | | | 307/32 |
| 2011/0148205 | A1* | 6/2011 | Moon | H02J 3/32 |
| | | | | 307/65 |
| 2014/0111891 | A1* | 4/2014 | Ward | H01H 47/043 |
| | | | | 361/42 |

FOREIGN PATENT DOCUMENTS

| | | |
|---|---|---|
| JP | 2008043144 A | 2/2008 |
| JP | 2009112080 A | 5/2009 |
| JP | 2015-220791 | 12/2015 |
| WO | 2016-067603 | 4/2017 |

OTHER PUBLICATIONS

International Search Report for Application No. PCT/JP2017/026631, dated Oct. 3, 2017.
Japanese Office Action dated Sep. 3, 2019 in corresponding Japanese Application No. 2018-547126.

* cited by examiner

POWER SUPPLY APPARATUS AND ELECTRICITY STORAGE DEVICE

CROSS REFERENCE TO RELATED APPLICATIONS

The present application is a continuation of PCT patent application no. PCT/JP2017/026631, filed on Jul. 24, 2017, which claims priority to Japanese patent application no. JP2016-210204 filed on Oct. 27, 2016, the entire contents of which are being incorporated herein by reference.

BACKGROUND

The present technology generally relates to a power supply apparatus and an electricity storage device that can supply power to a load even at the time of a power failure.

A power supply unit that can supply power to a load at the time of a power failure of a system power supply by using an electricity storage system is known. In this type of power supply apparatus, a system power supply and a load are disconnected by a switch at the time of a power failure, and the self-sustaining operation of a bidirectional converter starts, and a secondary battery supplies power to the load. Furthermore, at the time of power recovery from a power failure, the switch is closed after the self-sustaining operation is stopped. The switch is controlled by a control circuit.

SUMMARY

The present technology generally relates to a power supply apparatus and an electricity storage device that can supply power to a load even at the time of a power failure.

In the conventional technology, a current sometimes flows through the coil due to the malfunction of the control circuit. As a result, power supply to the load may be cut off due to the shutdown of the switch, or the switch may be closed during self-sustaining operation to result in a failure in the bidirectional converter.

Accordingly, the present technology provides a power supply apparatus and an electricity storage device that can reliably prevent current from flowing through the coil of the relay even when the control circuit malfunctions.

According to an embodiment of the present technology, a power supply apparatus is provided. The power supply apparatus includes a latch type first relay inserted between a system power supply and a load, where the latch type first relay includes a switch, a tripping coil configured to open the switch, and a closing coil configured to close the switch, an electricity storage system including a charging and discharging unit inserted between a secondary battery and the load, a non-latch type second relay including a contact and an operating coil configured to open and close the contact, where the operating coil is connected between the electricity storage system and the load, and a control circuit connected to the first relay via the contact of the second relay.

According to an embodiment of the present technology, an electricity storage device is provided. The electricity storage device includes a secondary battery, a charging and discharging unit connected to the secondary battery, and a control circuit configured to control a state of the charging and discharging unit, where the control circuit is connected to a latch type first relay inserted between a system power supply and a load via a contact of a non-latch type second relay.

According to at least one embodiment, even when the control circuit malfunctions, it is possible to reliably prevent a current from flowing to the closing coil or the tripping coil of a relay and to prevent erroneous operations such as cutting off of power supply to a load and a failure in a bidirectional converter when a switch is closed during a self-sustaining operation.

It should be understood that each effect described herein is not necessarily limited and and other suitable properties relating to the present technology may be realized and as further described.

DETAILED DESCRIPTION

The present technology generally relates to a power supply apparatus and an electricity storage device that can supply power to a load even at the time of a power failure. As described herein, the present disclosure will be described based on examples with reference to the drawings, but the present disclosure is not to be considered limited to the examples, and various numerical values and materials in the examples are considered by way of example.

Figure 1:
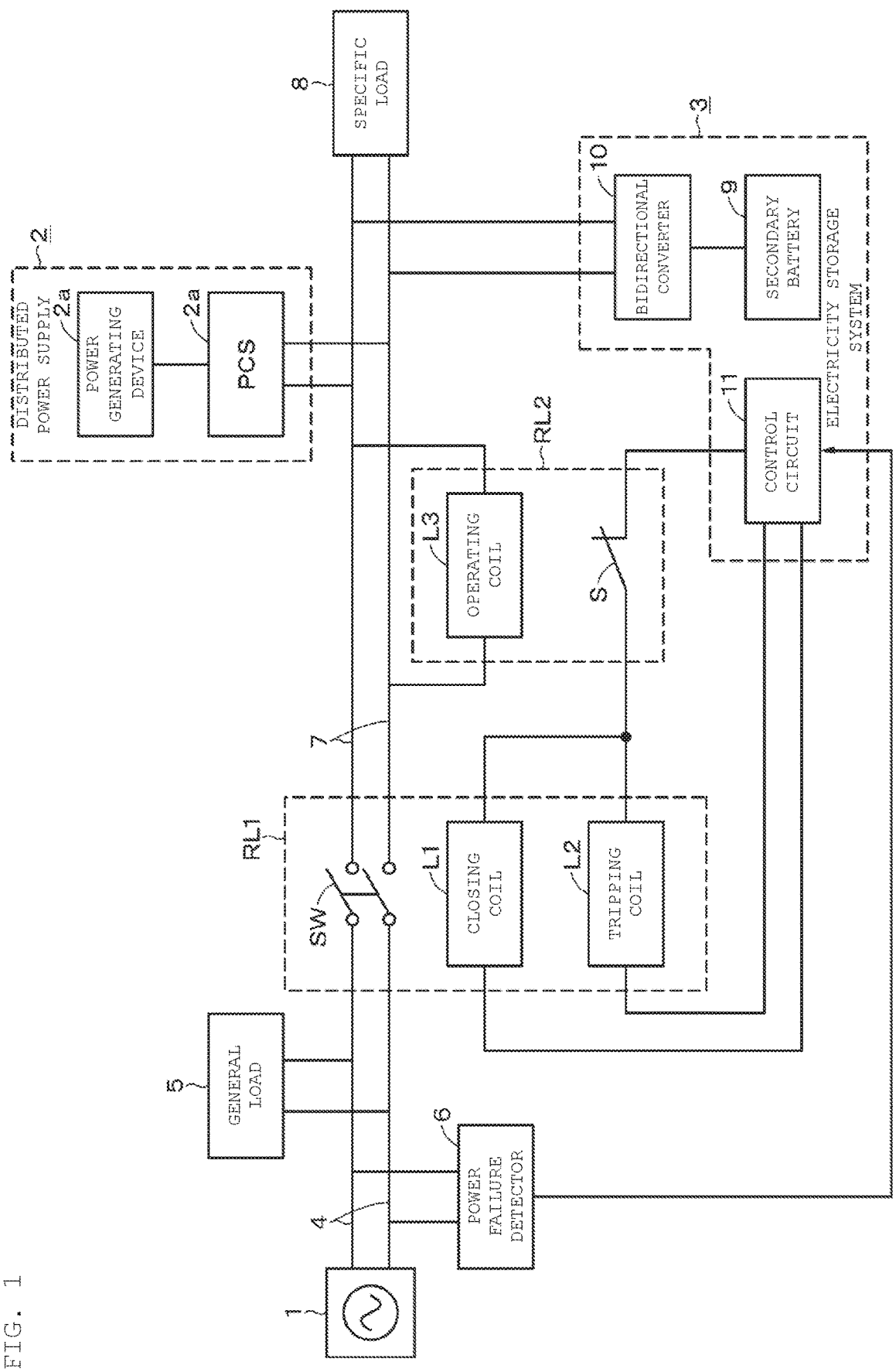
FIG. 1 is a block diagram according to an embodiment of the present technology.

As shown in FIG. 1, a power supply apparatus according to one embodiment of the present technology includes a system power supply 1, a distributed power supply 2, and an electricity storage system 3. The system power supply 1 is a power supply provided by a power company. The distributed power supply 2 has a power generating device 2a utilizing natural energy such as sunlight and a power conditioner (PCS) 2b. The power generating device 2a may include a solar cell.

A general load 5, a switch SW, and a power failure detector 6 are connected to a power line 4 connected to the system power supply 1 and wired. The distributed power supply 2 and a specific load 8 are connected to a power line 7 extending from switch SW. The switch SW disconnects or connects the power transmission between the power line 4 and the power line 7. That is, the switch SW opens and closes (ON/OFF) the connection between the system power supply 1 and the specific load 8. The specific load 8 is a predetermined load that needs to be supplied with power at the time of a power failure. The general load 5 is a load that does not need to be supplied with power at the time of a power failure.

The power failure detector 6 connected to the power line 4 is, for example, a power meter.

The power failure detector 6 measures the power of the power line 4 and detects whether prescribed power is present on the power line 4. That is, the power failure detector 6 detects an abnormality in the system power supply. It is also possible to detect an abnormality in the system power supply by measuring a voltage, current, frequency, and the like. The detection signal detected by the power failure detector 6 is supplied to a control circuit 11 of the electricity storage system 3. Although not shown, a ground over voltage relay (OVGR) (ground fault protection device) and a reverse power flow relay (RPR) may be connected to the power line 4. The OVGR is a device that monitors whether the system is normal or abnormal. Because a reverse power flow from the secondary battery 9 is not allowed, the RPR is a device that monitors so as to prevent a reverse power flow from the secondary battery 9.

The switch SW is a contact of a latch type relay RL1. The relay RL1 opens and closes the switch SW according to an energization mode for a closing coil L1 and a tripping coil L2. In other words, when the switch SW is closed (ON) by supplying a current to the closing coil L1, the switch SW is kept closed even after the current is stopped, whereas when the switch SW is opened (OFF) by supplying a current to the tripping coil L2, the switch SW is kept opened even after the current is stopped.

The electricity storage system 3 includes the secondary battery 9, a bidirectional converter 10, and the control circuit 11. The secondary battery 9 has many battery cells connected in series and/or in parallel. As a battery cell, for example, a lithium ion secondary battery is used. A rechargeable battery cell other than the lithium ion secondary battery may be used. It should be noted that the control circuit 11 may be provided in the bidirectional converter 10.

The bidirectional converter 10 is configured such that a charging circuit and a discharging circuit for the secondary battery 9 have a common configuration. The configuration obtained by connecting discrete charging and discharging circuits in parallel may be used in place of the bidirectional converter. The power input/output unit of the bidirectional converter 10 is connected to the power line 7. The control circuit 11 controls the switch SW, the secondary battery 9, and the bidirectional converter 10. The control circuit 11 controls the bidirectional converter 10 in one of a charging operation, a discharging operation, and a charge/discharge stopping state.

The power failure detector 6 supplies a detection signal to the control circuit 11.

The closing coil L1 and the tripping coil L2 of the relay RL1 are connected to the control circuit 11 so as to allow the control circuit 11 to supply a current to these coils. The contact S of the second relay RL2 is inserted between the control circuit 11 and the closing coil L1 and the tripping coil L2. The relay RL2 is a non-latch type relay, and the opening and closing (ON/OFF) of the contact S is controlled by energizing an operating coil L3. In this case, the contact S is the B contact. The B contact is normally closed (ON) (a state in which no current flows through the operating coil L3). When a current flows through the operating coil L3, the contact S is opened (OFF). When the current to the operating coil L3 stops, the contact S closes. It should be understood that the A contact is normally open (OFF) contrary to the B contact.

The operating coil L3 of the relay RL2 is connected to the power line 7. It should be noted that an alternating current signal on the power line 7 is converted into a direct current so as to flow through the operating coil L3. Therefore, when the system power supply 1 is normal, a current flows through the operating coil L3, and the contact S is open. When the contact S is open, the control circuit 11 cannot supply a current to the closing coil L1 and the tripping coil L2 of the relay RL1.

The operation performed under the control of the control circuit 11 according to the above-described embodiment will be described. When the system power supply 1 is normally supplied, the switch SW is closed, and power is supplied from the system power supply 1 to the specific load 8. In addition, because the contact S of the relay RL2 is open, no current flows through the tripping coil L2 even if the control circuit 11 malfunctions. Therefore, even if the control circuit 11 malfunctions, power supply to the specific load 8 is not interrupted.

When the system power supply 1 is not normal (in power failure or the like), no current flows through the operating coil L3 of the relay RL2, so that the contact S is closed. Because the power failure detector 6 detects a power failure and notifies the control circuit 11 of the occurrence of power failure, a current is supplied to the tripping coil L2 of the relay RL1. Therefore, the switch SW is opened, and the system power supply 1 is disconnected from the specific load 8. Thereafter, the control circuit 11 turns on the output of the bidirectional converter 10, and power is supplied from the secondary battery 9 to the specific load 8 (self-sustaining operation).

In the case in which the switch SW is open and power is being supplied to the specific load 8 by self-sustaining operation, the contact S is open. Therefore, even if the control circuit 11 malfunctions, no current flows through the closing coil L1 of the relay RL1. As a result, it is possible to prevent reverse flow to the system power supply 1 during a self-sustaining operation or a failure in the bidirectional converter 10 due to addition of the system power supply 1 to the bidirectional converter 10.

When the power failure detector 6 detects power recovery and informs the control circuit 11 of the power recovery, the output of the bidirectional converter 10 is turned off. As a result, no current flows through the operating coil L3, so that the contact SW is closed. When the control circuit 11 supplies a current to the closing coil L1, the switch SW is closed, and power is supplied from the system power supply 1 to the specific load 8, thus restoring the state before the power failure.

An operation will be further described with reference to the operation sequence of FIG. 2. The following operation will be described in descending order in FIG. 2.

In the "specific load" sequence, a high level represents power supply and a low level represents power shutdown.

In the "system" sequence, a high level represents normality and a low level represents an abnormality such as power failure.

In the "self-sustaining output" sequence, a high level represents "ON" and a low level represents "OFF".

In the "relay RL2" sequence, a high level represents "open" and a low level represents "closed".

In the "SW" sequence, a high level represents "closed" and a low level represents "open".

In the "tripping operation" sequence, a high level represents that a current flows through the tripping coil L2, and a low level represents that no current flows through the tripping coil L2. In the "closing operation" sequence, a high level represents that a current flows through the closing coil L1, and a low level represents that no current flows through the closing coil L1.

Figure 2:
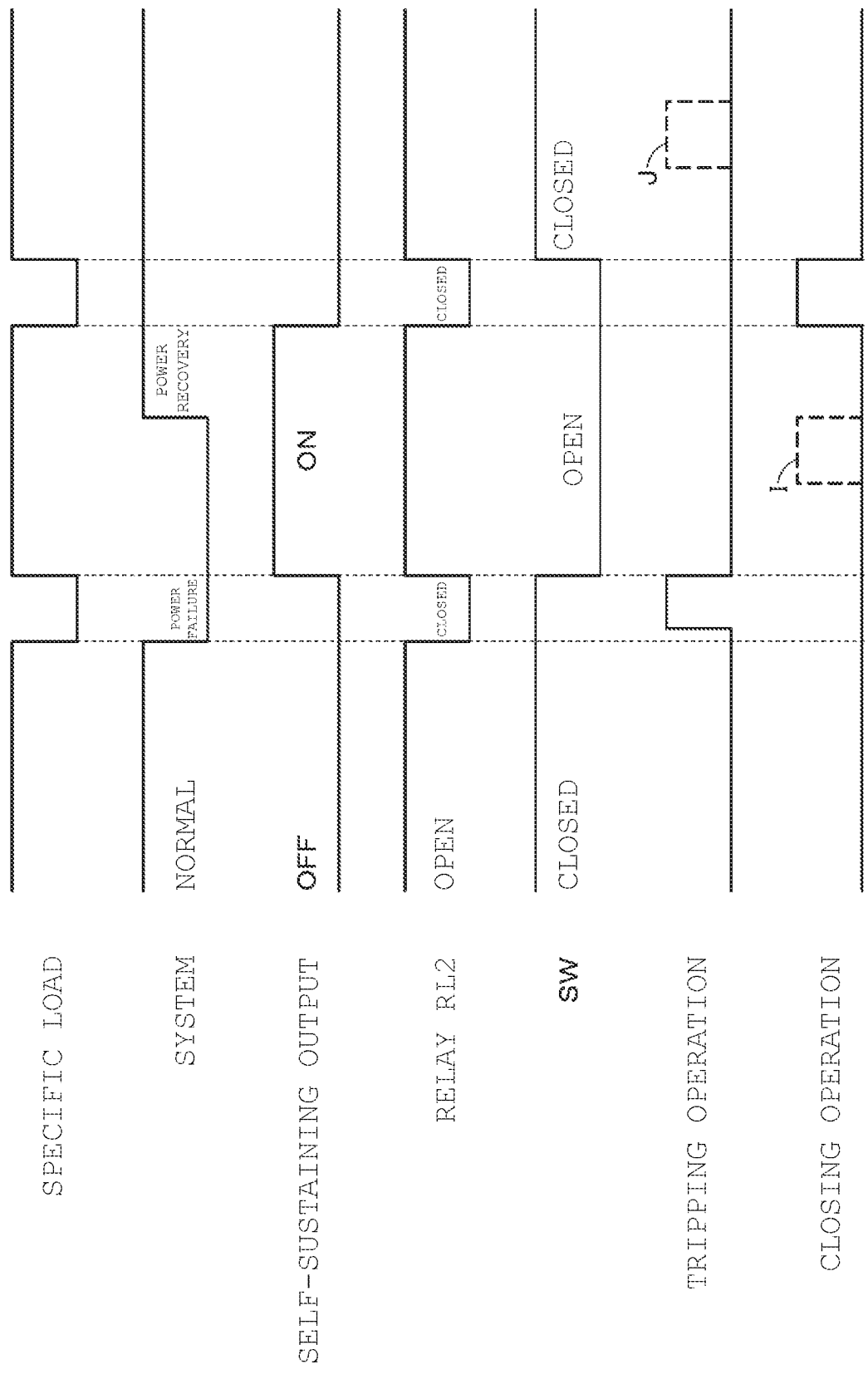
FIG. 2 is a timing chart used for explaining the operation of an embodiment of the present technology.

The initial state of the operation sequence of FIG. 2 represents a normal state, and each sequence is in the following state.

"Specific load" sequence: high level (supply of power)
"System" sequence: high level (normal)
"Self-sustaining output": low level (OFF)
"Relay RL2" sequence: high level (open)
"SW" sequence: high level (closed)
"Tripping operation" sequence: low level (no current flowing through tripping coil L2)

"Closing operation" sequence: low level (no current flowing through closing coil L1)

In the next state immediately after a power failure, each sequence is in the following state.

"Specific load" sequence: low level (shut down of power)
"System" sequence: low level (power failure)
"Self-sustaining output" sequence: low level (OFF)
"Relay RL2" sequence: low level (closed)
"SW" sequence: high level (closed)
"Tripping operation" sequence: high level (current flowing through tripping coil L2)
"Closing operation" sequence: low level (no current flowing through closing coil L1)

In a power failure state after the state immediately after the power failure, each sequence is in the following state.

"Specific load" sequence: high level (supply of power)
"System" sequence: low level (power failure)
"Self-sustaining output" sequence: high level (ON)
"Relay RL2" sequence: high level (open)
"SW" sequence: low level (open)
"Tripping operation" sequence: low level (no current flowing through tripping coil L2; no change in state of switch SW because of latch type)
"Closing operation" sequence: low level (no current flowing through closing coil L1)

In this power failure state, as indicated by the broken line, when the control circuit 11 malfunctions and attempts to supply a current to the closing coil L1, because the contact S is open, a current cannot be supplied to the closing coil L1. Therefore, the switch SW maintains the open state. As a result, it is possible to prevent a malfunction due to the connection of the system power supply 1 during a self-sustaining operation.

Immediately after power recovery, each sequence is in the following state.

"Specific load" sequence: low level (shutdown of power)
"System" sequence: high level (normal)
"Self-sustaining output": low level (OFF)
"Relay RL2" sequence: low level (closed)
"SW" sequence: low level (open)
"Tripping operation" sequence: low level (no current flowing through tripping coil L2; no change in state of switch SW because of latch type)
"Closing operation" sequence: high level (current flowing through closing coil L1)

In a power recovery state after the state immediately after the power recovery, each sequence is in the following state.

"Specific load" sequence: high level (supply of power)
"System" sequence: high level (normal)
"Self-sustaining output" sequence: low level (OFF)
"Relay RL2" sequence: high level (open)
"SW" sequence: high level (closed)
"Tripping operation" sequence: low level (no current flowing through tripping coil L2; no change in state of switch SW because of latch type)
"Closing operation" sequence: low level (no current flowing through closing coil L1)

In this power recovery state, as indicated by the broken line, when the control circuit 11 malfunctions and attempts to supply a current to the tripping coil L2, because the contact S is open, a current cannot be supplied to the tripping coil L2. Therefore, the switch SW maintains the closed state. As a result, the switch SW is opened in the recovery state. This makes it possible to prevent a malfunction in which the connection between the system power supply 1 and the specific load 8 is interrupted.

Figure 3:
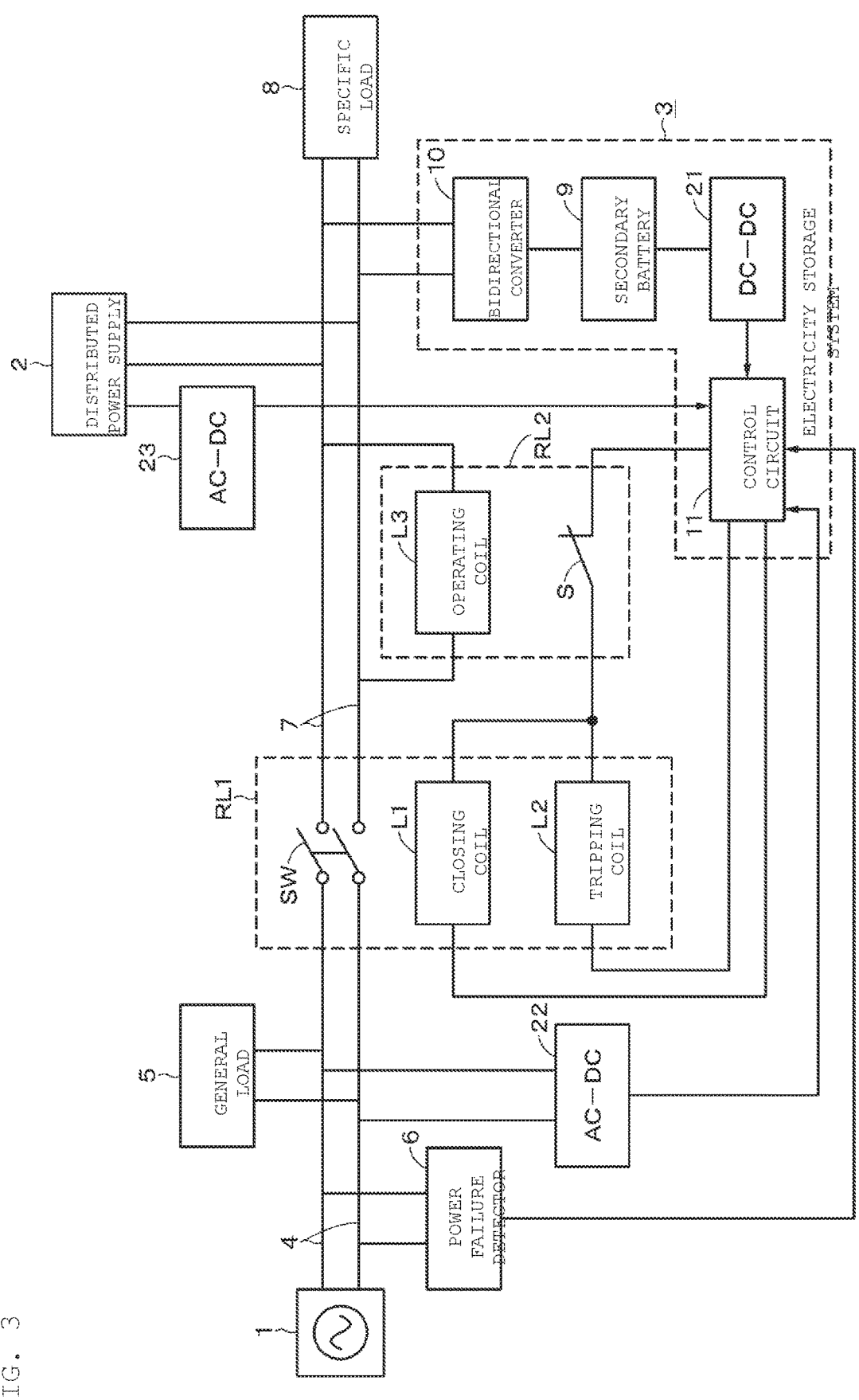
FIG. 3 is a block diagram for explaining power supply to a control circuit according to an embodiment of the present technology.

The supply of power to the control circuit 11 will be described with reference to FIG. 3. Power to the control circuit 11 is supplied from the secondary battery 9 via a DC-DC converter 21. In this configuration, when self-sustaining output is performed to the specific load 8 due to a power failure or the like, the remaining amount of the secondary battery 9 decreases. In the present technology, because the latch type relay RL1 is adopted, the control circuit 11 needs to function in order to reconnect the system power supply 1 and the specific load 8 at the time of power recovery. In consideration of this point, when the remaining amount of the secondary battery 9 drops by a certain amount or more, the self-sustaining output is stopped and the state of standby for power recovery is set.

As a result, it is possible to ensure that the remaining amount of the secondary battery 9 can guarantee the operation of the control circuit 11.

As a second example, power is supplied to the control circuit 11 from the secondary battery 9 via the DC-DC converter 21 and power is also supplied from the system power supply 1 via the AC-DC converter 22. In this way, even when the secondary battery 9 is empty, the control circuit 11 can function at the time of power recovery.

As a third example, power is supplied to the control circuit 11 from the secondary battery 9 via the DC-DC converter 21 and power is also supplied from the distributed power supply 2 via an AC-DC converter 23. In this way, even when the secondary battery 9 is empty, the control circuit 11 can function at the time of power recovery. Preferably, the configuration of the power supply of the second example or the third example is adopted. When the distributed power supply is a DC power generator, a DC-DC converter can be used in place of an AC-DC converter.

Figure 4:
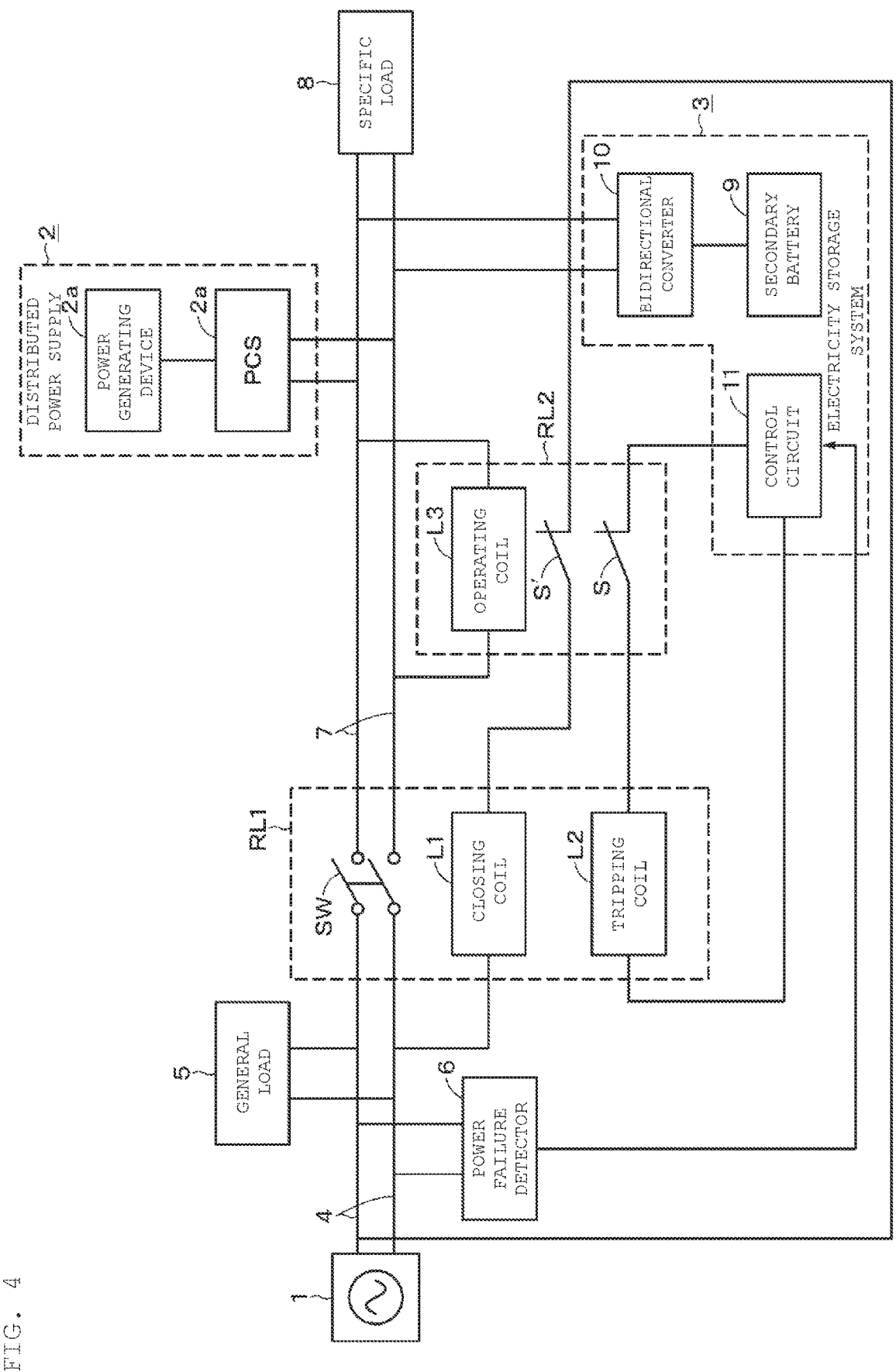
FIG. 4 is a block diagram according to an embodiment of the present technology.

Another embodiment of the present technology will be described with reference to FIG. 4. In comparison with the above-described embodiment, a two-contact type having contacts S and S' is used as a second relay RL2. A tripping coil L2 is connected to a control circuit 11 via the contact S. A closing coil L1 is connected between a system power supply 1 and the second relay RL2 via the contact S'.

According to this configuration, current can flow through the closing coil L1, and a switch SW can be closed. Therefore, even in a situation in which a secondary battery 9 is empty, an electricity storage system 3 is stopped, and the control circuit 11 is not functioning, the switch SW is closed at the time of power recovery, and the electricity storage system 3 can be recovered concurrently with power supply to a specific load 8.

Figure 5:
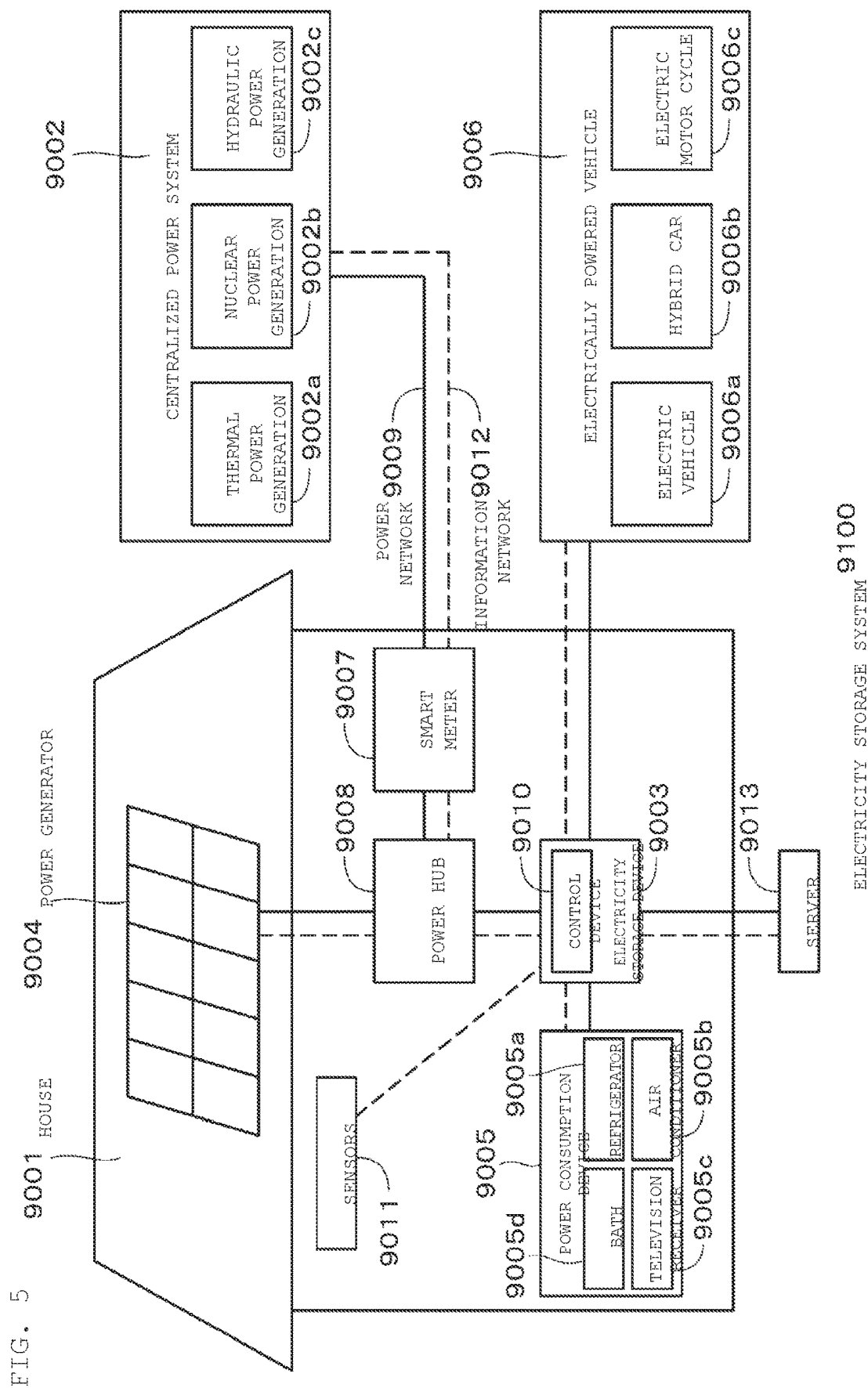
FIG. 5 is a schematic diagram showing an electricity storage system for a residential house according to an embodiment of the present technology.

An example in which the present disclosure is applied to an electricity storage system for a residential house will be described with reference to FIG. 5. For example, in an electricity storage system 9100 for a house 9001, power is supplied from a centralized power system 9002 such as thermal power generation 9002a, nuclear power generation 9002b, or hydraulic power generation 9002c to an electricity storage device 9003 via a power network 9009, an information network 9012, a smart meter 9007, a power hub 9008, and the like.

At the same time, power is supplied from an independent power supply such as a household power generator 9004 to the electricity storage device 9003. The power supplied to the electricity storage device 9003 is stored. The power to be used in the house 9001 is supplied using the electricity storage device 9003. A similar electricity storage system can be used not only for the house 9001 but also for a building.

The house 9001 is provided with the power generator 9004, a power consumption device 9005, the electricity storage device 9003, a control device 9010 for controlling each device, the smart meter 9007, and sensors 9011 for acquiring various types of information. The respective devices are connected via the power network 9009 and an information network 9012. A solar battery, a fuel cell, or the like is used as the power generator 9004, and the generated power is supplied to the power consumption device 9005 and/or the electricity storage device 9003. The power consumption device 9005 includes a refrigerator 9005*a*, an air conditioner 9005*b*, a television receiver 9005*c*, and a bath 9005*d*. Furthermore, the power consumption device 9005 includes an electrically powered vehicle 9006. The electrically powered vehicle 9006 includes an electric vehicle 9006*a*, a hybrid car 9006*b*, and an electric motorcycle 9006*c*.

The above-described battery unit according to the present disclosure is applied to the electricity storage device 9003. The electricity storage device 9003 is formed from a secondary battery or a capacitor.

For example, the electricity storage device 9003 is formed from a lithium-ion battery. The lithium ion battery may be stationary or may be used in the electrically powered vehicle 9006. The smart meter 9007 has a function of measuring the usage amount of commercial power and transmitting the measured usage amount to the power company. The power network 9009 may use any one or a combination of DC power feed, AC power feed, and non-contact power feed.

The various sensors 9011 include, for example, a human sensor, an illuminance sensor, an object detection sensor, a power consumption sensor, a vibration sensor, a contact sensor, a temperature sensor, and an infrared sensor. The information acquired by the various sensors 9011 is transmitted to the control device 9010. Based on the information from the sensors 9011, the control device 9010 can grasp the state of the weather, the state of a person and the like and minimize energy consumption by automatically controlling the power consumption device 9005. Further, the control device 9010 can transmit information on the house 9001 to an external power company or the like via the Internet.

The power hub 9108 performs processing such as branching of power lines and DC-AC conversion. Communication methods of the information network 9012 connected to the control device 9010 include a method using a communication interface such as a universal asynchronous receiver-transmitter (UART) and a method using a sensor network based on a wireless communication standard such as Bluetooth (registered trademark), ZigBee (registered trademark), or Wi-Fi. The Bluetooth (registered trademark) system is applied to multimedia communication and can perform one-to-many connection communication. ZigBee (registered trademark) uses the physical layer of the institute of electrical and electronics engineers (IEEE) 802.15.4. IEEE 802.15.4 is the name of a short-range wireless network standard called personal area network (PAN) or wireless (W) PAN.

The control device 9010 is connected to an external server 9013. The server 9013 may be managed by any of the house 9001, a power company, and a service provider. The information transmitted and received by the server 9013 includes, for example, power consumption information, life pattern information, power rate, weather information, natural disaster information, and power trade information. These pieces of information may be transmitted and received from a power consuming device (for example, a television receiver) in the home, but may be transmitted and received from a device outside the home (for example, a cellular phone). These pieces of information may be displayed on a device having a display function, for example, a television receiver, a cellular phone, or personal digital assistants (PDA).

The control device 9010 that controls each unit is formed from a central processing unit (CPU), a random access memory (RAM), a read only memory (ROM), and the like, and is accommodated in the electricity storage device 9003 in this example. The control device 9010 is connected to the power storage device 9003, the household power generator 9004, the power consumption device 9005, the various types of sensors 9011, and the server 9013 via the information network 9012, and has, for example, a function of adjusting the usage amount of commercial power and the power generation amount. In addition, the control device 9010 may have, for example, a function of conducting power trading on the power market.

As described above, the electricity storage device 9003 can store not only the power generated by the centralized power system 9002 such as the thermal power generation 9002*a*, the nuclear power generation 9002*b*, or the hydraulic power generation 9002*c*, but also the power generated by the household power generator 9004 (solar power generation and wind power generation).

Therefore, even if the power generated by the household power generator 9004 fluctuates, it is possible to perform control so as to make the amount of power sent to the outside constant or discharge as necessary. For example, the power storage device 9003 can be used in the following manner. The power obtained by photovoltaic power generation is stored in the power storage device 9003. At night, low-rate midnight power is stored in the power storage device 9003. The power stored in the power storage device 9003 is discharged and used in the daytime which is the time zone during which the electricity rate is high.

It should be understood that although in this case, the description has been given with respect to the example in which the control device 9010 is accommodated in the electricity storage device 9003, the control device 9010 may be accommodated in the smart meter 9007 or may be formed independently. Furthermore, the electricity storage system 9100 may be used for a plurality of homes in an apartment house, or may be used for a plurality of detached houses.

Although one embodiment of the present technique has been specifically described above, the present technique is not limited to the one embodiment described above, and various modifications based on the technical idea of the present technique are possible. For example, the configurations, methods, processes, shapes, materials, numerical values, and the like mentioned in the above embodiments are merely examples, and if necessary, different configurations, methods, processes, shapes, materials, numerical values, and the like may be used.

The present technology is described below in further detail according to an embodiment.

(1) A power supply apparatus including a latch type first relay inserted between a system power supply and a load and having a switch, a tripping coil for opening the switch, and a closing coil for closing the switch, an electricity storage system having a charging and discharging unit inserted between a secondary battery and the load, a non-latch type second relay having a contact and an operating coil for opening and closing the contact, with the operating coil being connected between the electricity storage system and the load, and a control circuit connected to the first relay via the contact of the second relay.

(2) The power supply apparatus according to (1), wherein the load is a load that needs to be supplied with power at the time of a power failure.

(3) The power supply apparatus according to (1) or (2), wherein the operating coil of the second relay is connected between the system power supply and the load.

(4) The power supply apparatus according to any one of (1) to (3), wherein the control circuit energizes the tripping coil of the first relay via the contact of the second relay.

(5) The power supply apparatus according to (1), wherein the closing coil of the first relay is connected to the system power supply.

(6) The power supply apparatus according to any one of (1) to (5), wherein a distributed power supply is connected between the system power supply and the load.

(7) The power supply apparatus according to (6), wherein the distributed power supply is used as a power supply of the control circuit.

(8) The power supply apparatus according to any one of (1) to (7), wherein the secondary battery of the electricity storage system is used as a power supply of the control circuit.

(9) The power supply apparatus according to any one of (1) to (8), wherein the system power supply is used as a power supply of the control circuit.

(10) An electricity storage device including a secondary battery, a charging and discharging unit connected to the secondary battery, and a control circuit configured to control a state of the charging and discharging unit and connected to a latch type first relay inserted between a system power supply and a load via a contact of a non-latch type second relay.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A power supply apparatus comprising:
   a latch type first relay inserted between a system power supply and a load, wherein the latch type first relay includes a switch, a tripping coil configured to open the switch, and a closing coil configured to close the switch;
   an electricity storage system including a charging and discharging unit inserted between a secondary battery and the load;
   a non-latch type second relay including a contact and an operating coil configured to open and close the contact, wherein the operating coil is connected to a power line connecting to the load and the switch of the latch type first relay; and
   a control circuit,
   wherein the contact of the non-latch type second relay is inserted between the control circuit and the tripping coil and the closing coil of the latch type first relay, and
   wherein the control circuit is configured to be electrically connected to the latch type first relay via the contact of the non-latch type second relay.

2. The power supply apparatus according to claim 1, wherein the load is configured to be supplied with power at a time of a power failure.

3. The power supply apparatus according to claim 1, wherein the operating coil of the second relay is connected between the system power supply and the load.

4. The power supply apparatus according to claim 1, wherein the control circuit is configured to energize the tripping coil of the first relay via the contact of the second relay.

5. The power supply apparatus according to claim 1, wherein the closing coil of the first relay is connected to the system power supply.

6. The power supply apparatus according to claim 1, wherein a distributed power supply is connected between the system power supply and the load.

7. The power supply apparatus according to claim 6, wherein the distributed power supply is configured to be used as a power supply of the control circuit.

8. The power supply apparatus according to claim 6, wherein the distributed power supply includes a power generating device and a power conditioner.

9. The power supply apparatus according to claim 8, wherein the power generating device includes a solar cell.

10. The power supply apparatus according to claim 1, wherein the secondary battery of the electricity storage system is configured to be used as a power supply of the control circuit.

11. The power supply apparatus according to claim 1, wherein the system power supply is configured to be used as a power supply of the control circuit.

12. The power supply apparatus according to claim 1, wherein the secondary battery includes a lithium ion secondary battery.

13. An electricity storage device comprising:
    a secondary battery;
    a charging and discharging unit connected to the secondary battery; and
    a control circuit configured to control a state of the charging and discharging unit,
    wherein the control circuit is configured to be electrically connected to a latch type first relay inserted between a system power supply and a load via a contact of a non-latch type second relay,
    wherein the latch type first relay includes a switch, a tripping coil configured to open the switch, and a closing coil configured to close the switch,
    wherein the non-latch type second relay includes the contact and an operating coil configured to open and close the contact, and the operating coil is connected to a power line connecting to the load and the switch of the latch type first relay, and
    wherein the contact of the non-latch type second relay is inserted between the control circuit and the tripping coil and the closing coil of the latch type first relay.

\* \* \* \* \*